United States Patent [19]
Burns

[11] Patent Number: 5,420,797
[45] Date of Patent: May 30, 1995

[54] METHOD OF DELIVERING PETROLEUM AND SIMILAR PRODUCTS USING ELECTRONIC IDENTIFICATION TAGS AND READING PROBE

[76] Inventor: Robert R. Burns, 4705 Wilford Way, Edina, Minn. 55435

[21] Appl. No.: 296,727
[22] Filed: Aug. 26, 1994
[51] Int. Cl.⁶ ............................................. G06F 17/60
[52] U.S. Cl. ...................... 364/479; 364/478; 222/1; 222/23; 222/52
[58] Field of Search ............... 364/478, 479; 222/25, 222/28, 51, 52, 1, 2, 23, 40; 221/2, 7, 5, 9; 340/825.55

[56] References Cited

U.S. PATENT DOCUMENTS

| | | | |
|---|---|---|---|
| Re. 31,089 | 11/1982 | Adamson | 340/825.55 |
| 5,270,943 | 12/1993 | Warn | 364/479 |
| 5,272,321 | 12/1993 | Otsuka et al. | 364/479 |
| 5,283,943 | 2/1994 | Aguayo et al. | 364/479 |
| 5,337,253 | 8/1994 | Berkovsky et al. | 364/479 |
| 5,360,139 | 11/1994 | Goode | 222/40 |

*Primary Examiner*—James P. Trammell
*Attorney, Agent, or Firm*—Haugen and Nikolai

[57] ABSTRACT

A method of delivering petroleum and similar products that ensures the accurate delivery of products, in accordance with the instructions on a series of load tickets, from a refinery, storage terminal, or other bulk storage facility to the tanks of a wholesaler, retailer or end-user. The method of delivery includes the use of a probe having digital memory and capable of comparing input signals with stored data. Each use of the probe is recorded, stored in memory, and later downloaded to a computer system to verify the drivers' compliance with the instructions of the series of load tickets.

17 Claims, 5 Drawing Sheets

Run Date: Mar 14, 1994 - 9:38 am                NORTH STAR OIL COMPANY
                            ORDER LOAD TICKET
LOAD NO   : 00133-0                      CUST/SHIP-TO-NO: FS   1
SHIP DATE : 03/15/94                     LOCATION: Edina Bulk Plnt
SHIP TIME : 2 AM
SHIP VIA  : No Star Trnsprt
                                  SHIP TO: Fast Stop #1 - St. Paul
DRIVER    : Al Barkley                    567 University Avenue
TRUCK     : 150  1990 Freightliner        St. Paul        MN. 55101
TRAILER   : 202 MC306-Heil 9,500 gallon NOTES:    Phone # 462-3344
          Open 24 hours
          FITTINGS - 3" Everites
          DRIVER: BACK INTO STATION FROM THE EAST DRIVEWAY

| CUSTOMER PRODUCTS ORDERED | QTY | POCKET | TOTAL QTY. |
|---|---|---|---|
| 122 Unleaded 87 Oct, 7.8% ethanol | 3000 | 1 | 3000 |
| 123 Premium 92 Oct, 7.8% ethanol | 1000 | 2 | 1000 |
| 124 Midgrade 89 Oct, 7.8% ethanol | 2500 | 4 | 2500 |
| 202 #2 Diesel fuel | 1500 | 3 | 1500 |

| TERMINAL PRODUCTS | Pkt 4 2500 | Pkt 3 1500 | Pkt 2 1500 | Pkt 1 4000 | Total 00--0 |
|---|---|---|---|---|---|
| Ashland Oil, St. Paul Park Terminal - 10 miles Use Fast Stop Billing Code 667-54-32 | | | | | |
| 122 Unleaded 87 Oct, 7.8% ethanol | | | | 3000 | 3000 |
| 123 Premium 92 Oct, 7.8% ethanol | | | 1000 | | 1000 |
| 124 Midgrade 89 Oct, 7.8% ethanol | 2500 | | | | 2500 |
| 202 #2 Diesel fuel | | 1500 | | | 1500 |
| TOTAL GALLONS | 2500 | 1500 | 1000 | 3000 | 8000 |
| TANK COVER DESCRIPTION | BLUE, WHITE CROSS | GREEN | RED, WHITE CROSS | WHITE, BLACK CROSS | |
| STATION TANK NUMBER | 03 | 04 | 02 | 01 | |
| TANK CHART | A | C | C | A | |
| MAXIMUM STICK READING | 78 | 69 1/4 | 74 3/4 | 73 1/4 | |
| BEGINNING STICK READING | | | | | |
| ENDING STICK READING | | | | | |

*Fig. 8*

Run Date: Jan 21, 1994 - 4:07 pm        NORTH STAR OIL COMPANY
                                ORDER LOAD TICKET LOAD NO   : 00119-0                     CUST/SHIP-TO NO: ROUTE 12
SHIP DATE : 01/25/94                    LOCATION: BULK PLANT
SHIP TIME : 11:01 AM  Free-form note xxxxx
SHIP VIA  : No Star Truck
                                        SHIP TO: Delivery List belowxxxxxxxx
DRIVER    : Jim Sorenson
TRUCK     : 92 Ford
TRAILER   : Galvaneer 2100, Dbl pump NOTES     : Note new customer, stop 15.

| PRODUCTS TO LOAD | Tote | Pkt 5 300 | Pkt 4 300 | Pkt 3 400 | Pkt 2 500 | Pkt 1 600 | Total 2100 |
|---|---|---|---|---|---|---|---|
| 202    #2 Heating Oil | | 300 | 300 | 400 | 500 | | 1500 |
| 122    Blended 7.8% Unleaded, 89 Octx | | | | | | 600 | 600 |
| M10W30 Mobil 10W30 Bulk Oil | T | | | | | | 350 |

| LOAD SUMMARY | | AVAILABLE | SCHEDULED | LOADED |
|---|---|---|---|---|
| 122    Blended 7.8% Unleaded, 89 Octx | | 0 | 600 | 600 |
| 202    #2 Heating Oil | | 90 | 1410 | 1500 |
| M10W30 Mobil 10W30 Bulk Oil | T | 0 | 350 | 350 |

DELIVERY LIST

| | CUSTOMER NAME & ADDRESS | | TANK & PRODUCT DESCRIPTION | SCHEDULE |
|---|---|---|---|---|
| 05 | Mrs. Jane Paulson 3805 Lyndale Avenue South xxxx | 202 | Pipe #1 on West wall #2 Heating Oil | 200 |
| 10 | West Side Auto Repair 2750 Hennepin Avenue South | 02 122 | Blue cover, white E Blended 7.8% Unleaded, 89 Octx | 300 |
| | | 10 TM10W30 | On North wall of shop Mobil 10W30 Bulk Oil xxxxxxxxxx | 350 |
| 15 | Mr. Ralph White 2535 Sheridan Avenue South | 202 | Pipe 3ft to left of back door #2 Heating Oil | 200 |
| 20 | Lincoln Motor Sales 1800 Nicollet Avenue South | 05 122 | Blue cover, white E Blended 7.8% Unleaded, 89 Octx | 300 |
| 25 | George J. O'Loughlin 1645 Second Avenue South | 202 | Pipe 2 ft North of side door #2 Heating Oil | 210 |
| 30 | Univ of Minn-White Hall 1200 Washington Avenue | 04 202 | Pipe with 3 green stripes #2 Heating Oil | 800 |

*Fig. 9*

METHOD OF DELIVERING PETROLEUM AND SIMILAR PRODUCTS USING ELECTRONIC IDENTIFICATION TAGS AND READING PROBE

BACKGROUND OF THE INVENTION

I. Field of the Invention

This invention relates generally to a method of delivering petroleum or similar products. More particularly, it relates to a method of ensuring the accurate delivery of a plurality of different petroleum or similar products from a refinery, storage terminal, or distributor's bulk storage facility (hereinafter referred to interchangeably as a storage facility) into the appropriate wholesaler's, retailer's, or end-user's storage tanks, and later verifying compliance with this method of delivery.

II. Discussion of the Related Art

Currently, in the delivery of petroleum and similar products, a petroleum transporter (e.g.: a common carrier, contract carrier, or owner of the products) picks up various quantities, types, and blends of the product from a storage facility, and then delivers the products to a customer. The customer (e.g.: a retail petroleum station or a residential heating oil user) may have a single storage tank or may have several storage tanks (underground or above-ground) used to store various types and/or blends of petroleum or similar products. The truck that is used may be a large 9,000 to 10,000-gallon transport, a smaller 2,000 to 4,000-gallon truck known as a tankwagon, or in some cases, a container truck that has removable tanks, which, in most respects, functions like a tankwagon.

Each truck may be partitioned into several compartments for transporting various types and/or blends of products. Each compartment of a typical transport truck has an outlet spigot (comprising a valve and a hose coupling) to which a delivery hose can be directly connected to transfer the product from the compartment to the customer's appropriate storage tank. Each compartment of a typical tankwagon or container truck has an outlet valve, which controls the flow of the compartment's product into a manifold and meter. A delivery hose may be permanently attached or coupled to an outlet of the meter. The delivery hose can then be used to transfer the product from the selected compartment to the customer's appropriate storage tank.

In the past, a transport driver delivering to a retail petroleum station would be provided with load tickets identifying the load number, the truck, the driver, the storage facility, the customer's location, the quantity and type/blend of product to be loaded into each truck compartment, and the description of the specific customer tank into which each specific truck compartment is to be emptied. In the past, a tankwagon driver delivering to a list of customers would be provided with load tickets identifying the load number, the truck, the driver, the storage facility, the quantity and type/blend of product to be loaded into each truck compartment, the list of customer locations to which deliveries should be made, the location and description of each customer tank or tank inlet pipe, and the quantity and type/blend of petroleum product to be delivered into each customer tank.

Retail petroleum stations usually use coded color markings painted on the cover of each underground storage tank. The markings are known by the transporter, to indicate the fuel type/blend to be put into each corresponding storage tank. The markings vary in color and shape, and may include, for example, a white background with a black cross designating 87 octane gasoline, a blue background with a white cross designating midgrade 89 octane gasoline, a red background with white cross designating premium 92 octane gasoline, and a solid green designating diesel fuel. These colors and figures are usually painted onto the storage tank covers, which are placed in the driveway over the tank inlet pipes. These markings frequently wear off, leaving the tank covers hard to distinguish from each other. Also, through inadvertence, a cover may be replaced over the wrong storage tank, thereby improperly indicating a particular fuel inlet that is not consistent with the fuel already in the storage tank. To attempt to prevent this from causing a product mix on the next delivery, the customer tanks may also be numbered or labeled on the tank inlet. However, the inlet numbering may be obscured or in poor light, making positive identification difficult for the driver. These factors contribute to unloading errors, or product mixes, in which the wrong type of product is delivered into the storage tank.

At a minimum, mixing two gasolines of different octane ratings reduces the value of the higher-octane quantity; the maximum additional costs of mixing two gasolines is the required additional expensive handling. The least costly mistake is to deliver a higher octane gasoline into a tank than is required, since the only effect is that the retailer must sell it at the lower price at which the retail pumps are marked. As an example, delivering 2,000 gallons of 92-octane premium gasoline into an 87-octane regular gasoline tank costs the transporter the difference in wholesale price between these two products, or currently about $160 in this example, compared to the current $40 transportation fee for delivering 2,000 gallons in a typical metropolitan area. By comparison, delivering 2,000 gallons of 87-octane gasoline into a 92-octane gasoline tank can be much more costly, since the retailer cannot legally continue to sell this reduced-octane gasoline without reducing the pump octane markings and selling price, which retailers are loathe to do. If the tank will not hold enough 92-plus octane gasoline to re-establish the overall octane rating at 92 (which it probably will not), some of this product must be pumped out and put into a lower-octane retailer tank or returned to a refinery. The tank must then be refilled with 92-plus octane gasoline to reach the overall 92-octane level. A 2,000-gallon error of this type can currently cost $700 or more, compared to the current transportation fee of $40.

Another cause of improper fuel delivery to retail petroleum stations is the failure of a driver to properly follow the instructions of the load ticket. The driver may not couple the delivery hose between the truck compartment spigot and the customer's storage tank in accordance with the load ticket instructions. An incorrect delivery can be as serious as putting diesel fuel into a customer's gasoline storage tank or vice versa. This can prove costly, currently exceeding $10,000 or more for the required pumping out the tank, returning the mixed product to a terminal for re-processing (or incinerating the product if the gasoline contained ethanol, which currently is not accepted by refineries), and refilling the tank with the correct product; plus the potential additional cost of repairing vehicle engines damaged by the use of the improper fuel type. Therefore, a need exists to provide a method of delivering products that confirms to the driver that the proper truck compartment and storage tank according to the corresponding load ticket has been selected, before the product is delivered.

A further need exists to ensure that the driver follows the intended sequence of deliveries of the day's loads to retail petroleum facilities. For each day's shift, each driver is given several load tickets for delivery. The load tickets are sequenced by scheduled time of delivery. The driver is expected to pick up and deliver the products according to this time sequence of the load tickets. If the sequence of the load tickets is not followed, the driver may deliver the wrong quantity or type/blend of product to the retailer. For example, the driver may have two separate load tickets for a specific retailer on the same day. The first load of the two may be the driver's first load scheduled in the morning, and the second load may be the last load scheduled that day. If the intended sequential order of the load tickets is not followed, quantities of the several products scheduled for the delivery at the end of the day probably will not fit into the retailer's tanks in the morning. At the least, this can cause a partial-compartment delivery, and require that the remaining product in the truck compartment be delivered somewhere else or returned to the storage facility. The cost of this error is increased by the fact that the exact quantity of the product delivered—and of that remaining in the compartment—is not exactly known since this type of transport delivery is unmetered. Therefore, a need exists to provide a method of ensuring the accurate delivery of products in sequential order according to sequentially ordered load tickets.

An additional need exists to ensure the accurate delivery of products to retail petroleum facilities according to the sequence planned for the loads. Sometimes the repetitive appearance of the stations can lull the driver into a mistake, especially when delivering to retail outlets of the same franchisor or ownership. For example, since each driver is given several load tickets for delivery on each shift, it is possible that the driver will load the truck for the driver's second load of the day, as an example, and erroneously drive to the day's third retailer location. Although everything looks all right (in fact, it may look nearly identical to the intended location, including customer tank color-coding and numbering), the truck compartment assignments and corresponding retailer tank assignments are most likely to be wrong. In this case, the driver is likely to both create a product mix and be stopped from fully emptying the truck compartments.

Customers that are wholesalers or end-users will more often have above-ground tanks that are not marked as well as retail facilities. Some of these may have only one tank (e.g., residential heating oil customers) and others may have many tanks (e.g., automotive repair facilities) that store petroleum fuels and lubricants, brake fluids, transmission fluids, anti-freeze, and synthetic lubricants. The transporter must also have these tanks and inlets identified by color coding and/or numbering to help prevent deliveries into the wrong tank. The most frequent error in residential heating oil deliveries is delivery to the wrong customer, either to the wrong house or to the wrong storage tank of a multi-residence building. Expensive product mixes can also occur in delivery of products to commercial customers, such as auto repair shops, that have several tanks storing a multiplicity of products.

There is a need to ensure compliance by the drivers with the load tickets' instructions, whether for delivery to wholesalers, retailers, or end-users. Compliance by the drivers reduces the amount of potential liability the transporter may have for improper delivery of the various products.

The method and apparatus of the present invention obviates all of the above problems. It is accordingly a principle object of the present invention to provide a method for ensuring accurate delivery of petroleum and similar products from a storage facility to a customer.

Another object of the present invention is to provide a method for delivering products with increased accuracy that is economical, simple and efficient to use.

Yet another object of the present invention is to provide a method of delivering products that is reliable, dependable, cost effective and easy to follow.

Still a further object of the present invention is to provide a method of delivering products that further reduces the risk of transferring a type or blend of petroleum or similar product into the wrong storage tank.

Yet another object of the present invention is to provide a method of delivering products that further reduces the risk of delivering a load of products out of the sequence scheduled for the day's work, and reduces the risk of a partial delivery of an unmetered compartment of products.

A further object of the present invention is to provide a method for delivering products that includes a system of monitoring the driver with respect to compliance with the delivery instructions and to compliance with the scheduled sequence of delivery of the day's loads.

SUMMARY OF THE INVENTION

In accordance with the present invention, a machine-readable identification system involving a plurality of passive read-only memory (passive ROM) devices, each capable of storing a unique digital serial number, and which can be interrogated by a portable hand-held probe, are affixed integral to the truck compartment spigots or valves and to the inlet pipes leading to the customer's tanks. The driver also has one of the passive read-only memory devices permanently affixed to the driver's personal ID badge. With no limitations intended the ROM devices may comprise an electronic identification data carrier of the following type: Touch Serial Number DS1990 manufactured and sold by Dallas Semiconductor Corp. A portable digital hand-held probe used to interrogate the ROM devices may be a compatible probe manufactured by Videx Corporation or other manufacturer.

The passive ROM device includes a unique 48-bit serial number or machine-readable identifier value. The hand-held probe includes a battery, real-time clock, a microprocessor chip, a ROM memory for storing a program of instructions to be executed by the microprocessor, a RAM memory for storing date, time, operands, and identifier values read out from the passive ROM devices, and a means for interrogating the passive ROM devices with the hand-held probe. The probe also includes an indicator device, that may be, for example, an audible beeper or a visual readout such as an LED signal light.

At the beginning of each delivery day, the driver is given several load tickets detailing the quantities, types, and blends of products to be delivered to each customer, and is given a hand-held probe that has been previously loaded with information from the transporter's office computer that correlates with the load tickets to be executed during the day. The load tickets are arranged in sequential order of delivery time based on the customer's product replenishment needs and truck operating efficiencies. While delivering products during the day, the driver uses the hand-held probe for interrogating the passive ROM devices that are attached to the driver's identification badge, to the truck's spigots or valves, and to the inlets of the customer's storage tanks.

When delivering products to a customer, the driver may deliver several different types or blends of products to the corresponding storage tanks at the customer's site. The hand-held probe is used to ensure that the driver delivers the products to the correct customer, ensuring that the proper type or blend of petroleum product in the compartment of the truck is transferred into the appropriate customer's storage tank. The hand-held probe is also used to ensure that the driver delivers the day's loads according to the scheduled sequence. The order of transferring each different type or blend of product to the appropriate storage tank is inconsequential. A series of beeps or other type of signal may be emitted from the hand-held probe to inform the driver whether or not the product from the selected compartment should be delivered to the selected storage tank. Each verification and each warning is stored in the digital memory of the hand-held probe, namely: the serial numbers of the selected truck compartment and customer tank, the date and time of the action, and a record of the signal given to the driver.

At the end of each day, the driver's probe is returned to the dispatcher at the transporter's facility, and all of the data representing the verifications and warnings given to the driver is downloaded from the digital memory of the hand-held probe into the office computer. All of the day's deliveries, the sequence and time in which the driver performed the deliveries, and the uses and non-uses of the probe may be compared with the proper instructions and sequential order of the load tickets. The comparison is made to monitor the driver's compliance with the proper delivery method and instructions, and to analyze the delivery operations for the purpose of improving the delivery operations.

The foregoing and other objects and advantages of the present invention will be readily apparent to those skilled in the art from a review of the following detailed description of the preferred embodiment, in conjunction with the accompanying drawings and claims.

DESCRIPTION OF THE DRAWINGS

FIG. 9 is a representation of a sample tankwagon load ticket and delivery list.

DETAILED DESCRIPTION OF THE PREFERRED EMBODIMENT

Figures 2, 3, 4:
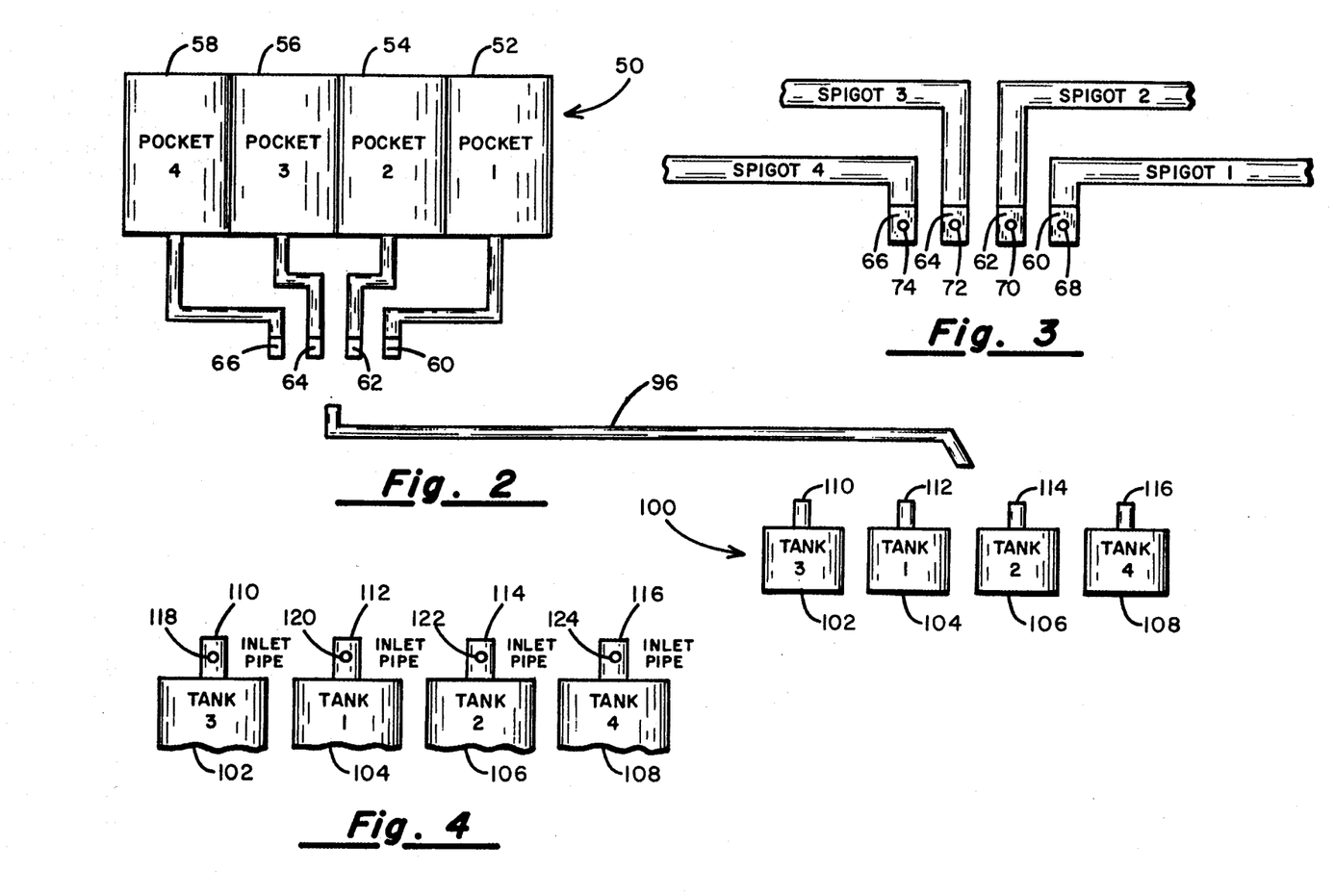
FIG. 2 is a block diagram of a transport delivery truck, compatible for use in the preferred method of delivering petroleum and similar products, a hose used to couple the truck's compartments with a customer's storage tanks, and a customer's storage tanks.
FIG. 3 is a partial exploded view of the block diagram in FIG. 2, showing the transport truck's compartment spigots, with the machine-readable identifiers attached.
FIG. 4 is a partial exploded view of the block diagram in FIG. 2, showing a customer's inlet pipes leading to the storage tanks, with the machine-readable identifiers attached.

Referring first to FIG. 2 there is indicated generally by block diagram, a transport delivery truck 50, a hose 96, and a plurality of a petroleum retailer's or other customer's storage tanks 100. The transport delivery truck 50 has a plurality of compartments 52, 54, 56, and 58 into which petroleum and similar products may be delivered. At the bottom of each compartment is a corresponding spigot (valve and hose coupling) 60, 62, 64 and 66 which allows the product to be emptied from each compartment. Each spigot has a passive ROM device 68, 70, 72, 74 attached that is machine-readable and allows each spigot to be accurately associated with each compartment (see FIG. 3). The hose 96 allows each spigot 60, 62, 64, and 66 of the transport delivery truck 50 to be coupled to the plurality of retailer's storage tanks 100.

Figures 5, 6:
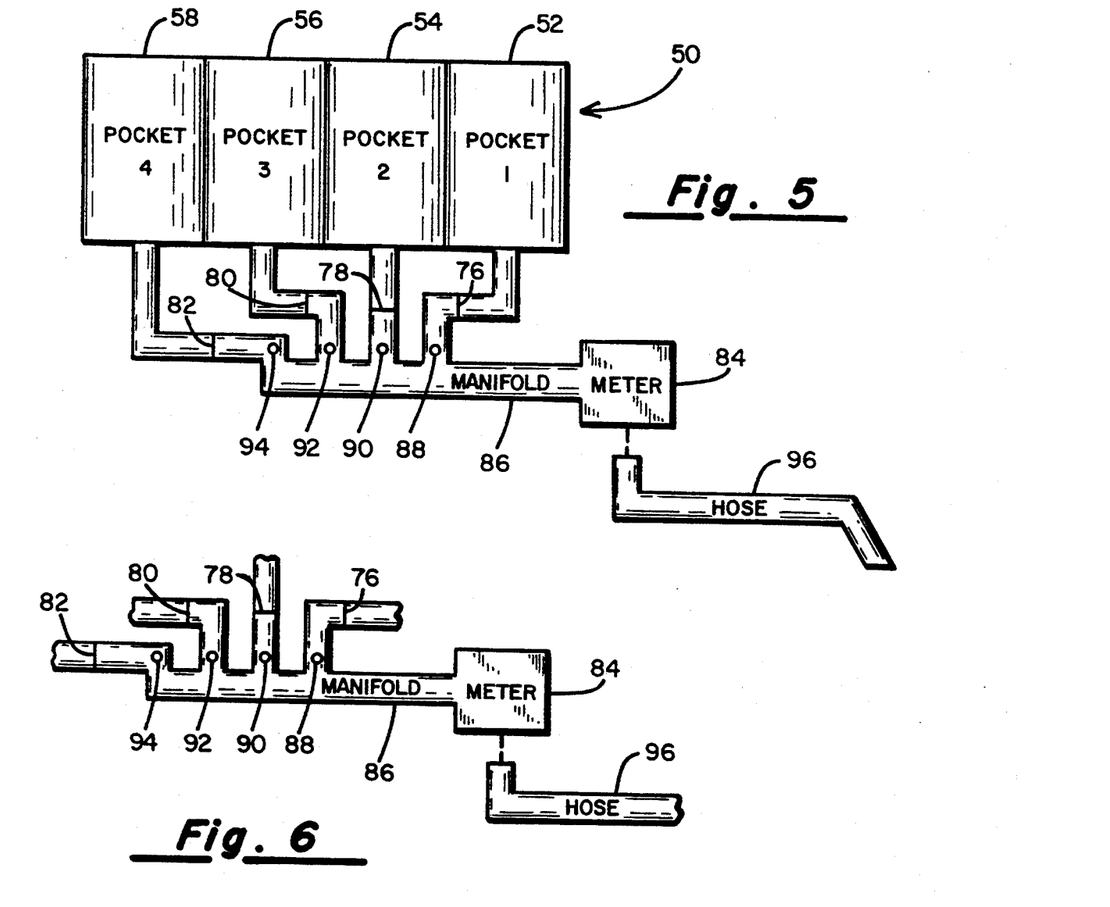
FIG. 5 is a block diagram of a tankwagon delivery truck compatible for use in an alternate preferred method of delivering petroleum and similar products, with a meter connected to a manifold, and a hose that may be connected to the trucks meter, to couple the truck's compartments with a customer's storage tanks.
FIG. 6 is a partial exploded view of the block diagram in FIG. 5, showing the tankwagon truck's compartment valves joined to a manifold with the machine-readable identifiers attached.

Referring next to FIG. 5 there is indicated generally by block diagram, the delivery truck 50 having at the bottom of each compartment a corresponding valve 76, 78, 80, and 82 that controls the flow of the product from the compartment to a manifold 86. A delivery truck of this type is referred to as a "Tankwagon". The manifold 86 has a meter 84 attached to thereby monitor the volume of product flowing past the meter 84. A delivery hose 96 may be permanently attached or coupled to the meter 84. Each valve has a passive ROM device 88, 90, 92, and 94 that is machine-readable and allows each valve to be accurately associated with each compartment (see FIG. 6). The delivery hose 96 allows each compartment 52, 54, 56, or 58, the corresponding valve 76, 78, 80, or 82, and the manifold 86 of the tankwagon delivery truck 50 to be coupled to the plurality of retailer's or other customer's storage tanks 100.

Each customer's storage tank 102, 104, 106 and 108 has a corresponding inlet pipe 110, 112, 114, and 116 which allows the transfer of product into the storage tank. Each inlet pipe has a passive ROM device 118, 120, 122, and 124 attached that is machine-readable which allows each inlet pipe to identify the storage tank and insure delivery of the proper product into the storage tank (see FIG. 4). The driver also has one of the passive read-only memory devices 42 permanently affixed to the driver's personal ID badge. The passive ROM device 42 could also be attached to the product-delivery pipes or hoses of the storage facility to verify the correctness of the delivery of products into the truck compartments.

The hand-held probe 40 has a means for accepting or receiving information from the passive ROM memory device 42. Each passive ROM device 42 is capable of storing a digital value and may be interrogated by the portable hand-held probe 40 (see FIG. 7). With no limitation intended the ROM device 42 may comprise an electronic identification data carrier of the following type: Touch Serial Number DS1990 manufactured and sold by Dallas Semiconductor Corp. The portable digital hand-held probe 40 used to interrogate the ROM devices 42 may be a compatible probe manufactured by Videx Corporation or other manufacturers.

Figure 7:
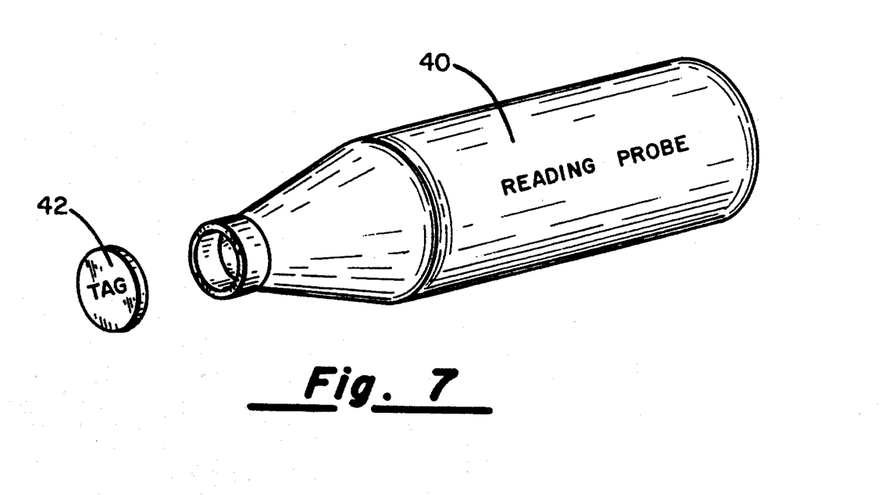
FIG. 7 is a perspective view of a hand-held probe aligned and elevated above a passive ROM memory identifier device.

The passive ROM device 42 includes a unique 48-bit serial number or machine-readable identifier value. The passive ROM device 42 comprises a passive ROM capable of storing 64 bits of ROM in a rugged moisture proof container of a size comparable to a standard watch button battery. Those skilled in the art will appreciate that other machine-readable storage and coding schemes, such as bar code, could be used as well. If a different coding scheme, such as bar coding, is used, the probe will have to be one capable of scanning and converting the bar code to a digital value; the probe 40 may later be downloaded to an office computer system capable of receiving the data stored in the probe 40 that was conveyed or transmitted from the device 42. A compatible computer must also be capable of comparing the transmitted data from the probe with information previously stored in the office computer's memory. In the preferred embodiment the passive ROM device or machine-readable identifier or tag 42 has information stored that may represent a unique identification number.

The hand-held probe 40 includes a battery, real-time clock, microprocessor chip, a ROM memory for storing a program of instructions to be executed by the microprocessor, a RAM memory for storing date and time of driver actions, operands, and identifier values read out from the passive ROM devices, and a means for interrogating the passive ROM devices with the hand-held probe. The probe also includes an indicator device, for example, an audible beeper or a visual readout such as an LED light display. The hand-held probe may be linked with a personal computer, allowing data to be uploaded into a specific segment of the probe's RAM memory. The hand-held probe 40 is designed to align and engage (interrogate) with the passive digital memory identifier 42. When the hand-held probe is engaged with the passive ROM device 42, an electric signal is transmitted to the hand-held probe 40. This signal represents an electronic serial number. Each time the hand-held probe 40 receives an electronic serial number, the probe converts this signal into a digital number, storing each number in sequential order. The hand-held probe 40 compares the digital value representing the electronic serial number with pre-programmed serial numbers assigned to the truck compartments and to the storage tanks going through the logic sequence necessary to make the decision whether the driver is following load ticket instructions.

The hand-held probe 40 is programmed to emit two beeps if, after following the logic sequence, it is determined that the electronic information from the passive ROM device 42 matches the appropriate data stored in the probe's internal memory. The signal emitted from the hand-held probe 40 could also be a series of blinking lights, a message on an LED display or some other indicator; however, a series of beeps is the preferred emitted signal. If no match occurs, a different series of beeps ensues. At the end of each day's use, all the data stored in the probe's RAM during use of the probe 40 may be downloaded into the office computer. A comparison may then be made between the desired sequence of use of the probe 40 and the actual use of the probe by the driver to determine the driver's compliance to both the load ticket instructions and to the proper method of delivery.

A specific passive ROM device 42 is assigned to each driver, carrying with it that driver's I.D. number. The hand-held probe 40 is used to compare the passive ROM device (electronic I.D. number) attached to the driver's ID badge with the driver identification number stored in the memory of the probe 40 assigned to the driver, with the beep pattern indicating a proper assignment. The driver ID badge and ROM device 42 is also used as a further communication device between the driver and the probe's program when an out-of-sequence delivery is attempted and is noted by the probe.

Figure 1:
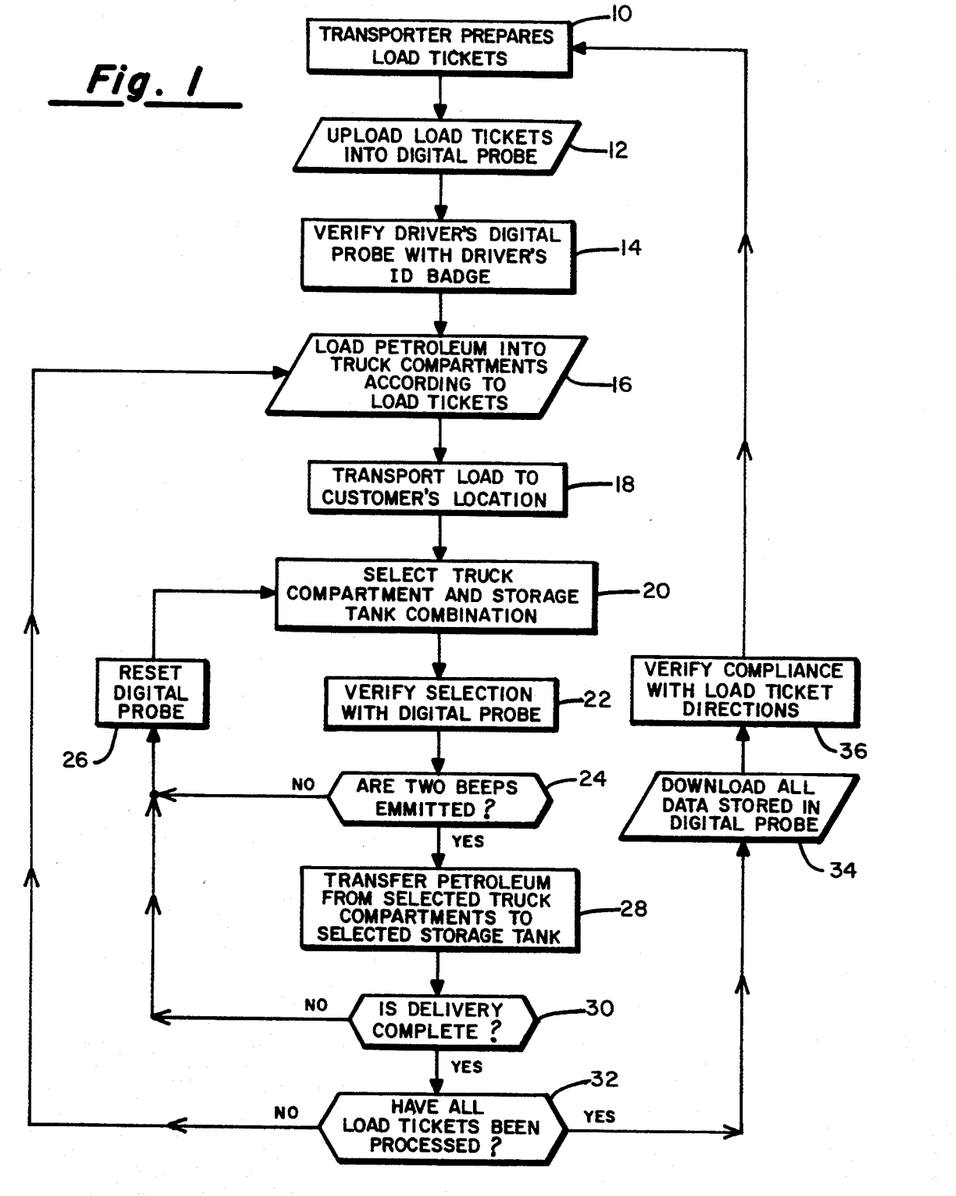
FIG. 1 is a flow chart representing a preferred method of delivering petroleum and similar products.
Figure 8:
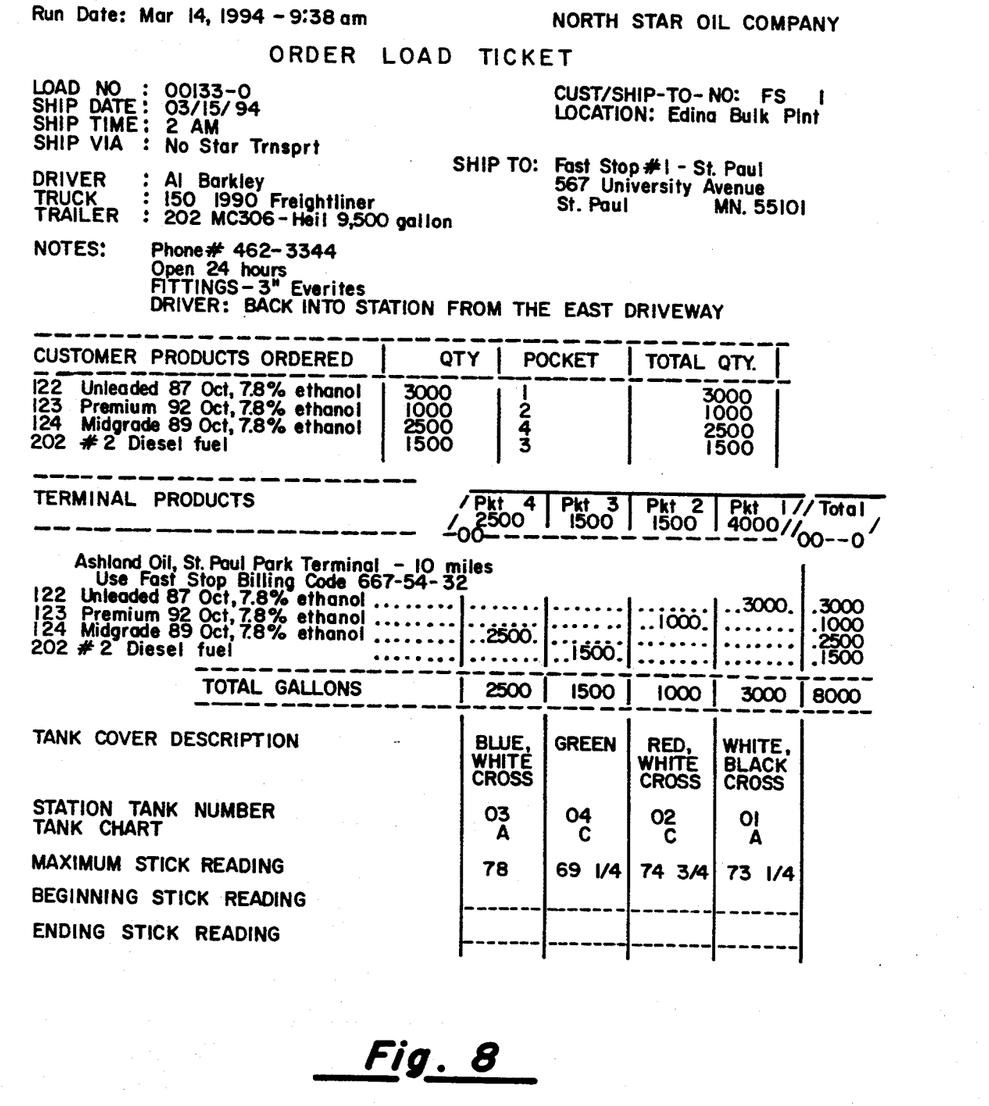
FIG. 8 is a representation of a sample transport load ticket.

Referring next to FIG. 1, there is indicated generally by means of a flow diagram the preferred method of petroleum product delivery of the present invention utilizing the digital probe 40 and the passive ROM device or machine readable identifier 42. Before a driver begins the deliveries for the day, load tickets are prepared on a computer at the transporter's facility for each driver (block 10). The load tickets (see FIGS. 8 and 9) contain all the information the driver needs to complete all the deliveries to be made by the driver for the day. The load tickets may vary according to the type of delivery truck that is used. For example the load ticket shown in FIG. 8 may be used with a transport delivery truck and the load ticket shown in FIG. 9 may be used with a tankwagon delivery truck. Also, the load tickets are given to the driver in sequential order by ship time, according to the order that the products are to be delivered to various retailers or other customers. The sequential order is determined by considering each customer's product replenishment needs and the geographic location of the customer relative to the truck's efficient utilization.

The load ticket for a transport driver delivering to a retail petroleum station may contain the following information: the load number, the truck, the driver, the storage facility, the customer's location, the quantity and type/blend of product to be loaded into each truck compartment, and the description of the specific customer tank into which each specific truck compartment is to be emptied. The load ticket for a tankwagon driver delivering to a list of wholesale or end-user customers may contain the following information: the load number, the truck, the driver, the storage facility, the quantity and type/blend of product to be loaded into each truck compartment, the list of customer locations to which delivery should be made, the location and description of each customer tank or tank inlet pipe, and the quantity and type/blend of product to be delivered into each customer tank. The driver identification number, load ticket numbers, truck compartment identification numbers, and the storage tank identification numbers (sequentially ordered in groups) are all uploaded into the hand-held probe's digital memory (block 12) from an office computer in the transporter's office.

Once the driver has confirmed that the proper hand-held probe 40 has been selected, by engaging the probe with the passive digital memory identifier 42 attached to the driver ID (block 14), the driver proceeds to the first storage facility on the driver's load tickets for the day and fills up the compartments 52, 54, 56, and 58 of the delivery truck 50 with the various types/blends of petroleum according to the load ticket (block 16). A passive ROM device 42 could also be attached to these storage tanks at the storage facility, thereby requiring the driver to verify the loading of the petroleum into the proper truck compartments 52, 54, 56, or 58. The current method does not employ these additional steps because the various products are rarely placed in the improper truck compartment when loading the petroleum into the delivery truck 50 in accordance with the load ticket.

With the compartments filled according to the load ticket, the driver drives the delivery truck 50 to the retailer listed on the load ticket (FIG. 8) in the case of a transport delivery truck or to the first customer listed on the load ticket's delivery list (FIG. 9) in the case of a tankwagon delivery truck (block 18). The load ticket for a transport delivery truck shows which compartment 52, 54, 56 or 58 corresponds to the correct storage tank 102, 104, 106, or 108. The load ticket and delivery list for a tankwagon lists each customer stop and the product(s) to be delivered at that stop. The driver selects the proper truck compartment and proper corresponding storage tank according to the load ticket or delivery list (block 20).

For a transport delivery truck load, the driver verifies the compartment/tank selection as proper by first aligning and engaging the hand-held probe 40 to a passive digital memory identifier 68, 70, 72 or 74 attached to the truck compartment spigots 60, 62, 64 or 66 that corresponds to the selected truck compartment 52, 54, 56 or 58. For a tankwagon load, the driver verifies the compartment/tank selection as proper by first aligning and engaging the hand-held probe 40 to a passive digital memory identifier 88, 90, 92, or 94 attached to the truck compartment valves 76, 78, 80, or 82 that corresponds to the selected truck compartment 52, 54, 56, or 58. After verifying the compartment, and within three minutes, the driver must align and engage the hand-held probe 40 with a passive digital memory identifier 118, 120, 122 or 124 that corresponds to the selected storage tank 102, 104, 106 or 108 (block 22). If the three-minute time limit has expired, the probe will signal the driver by a beep response to re-touch the truck compartment's passive digital memory identifier.

If the correct compartment and storage tank have been selected the hand-held probe will emit two beeps (block 24). If two beeps are emitted the driver then transfers the product from the selected compartment to the selected storage tank (block 28).

If the hand-held probe emits more than two beeps, say six beeps, the driver is warned that this is an improper connection. The probe resets itself (block 26) to allow the driver's next action. The driver may then re-select the proper tank compartment and storage tank to see if this selection is proper, by using the above described steps (blocks 20 and 22). If more than two beeps are again emitted the driver does not deliver the product to the selected storage tank from the selected tank compartment. The driver continues repeating the compartment/tank selection process (block 20) until the delivery has been completed (block 30). For a transport delivery truck, this is usually when the transport is empty; for a tankwagon delivery truck, the delivery is completed when the volume of products for this customer stop have been delivered.

If some load tickets remain unfilled (block 32), the driver then goes to the supplier listed on the next load ticket of the sequence and loads petroleum into the truck compartments according to the load ticket (block 16). Once all the load tickets have been completed, the driver returns to the transporter's office and turns in the hand-held probe 40.

The hand-held probe stores all the electronic serial numbers or marks that are transmitted or conveyed to the hand-held probe, the date and time of each action, and the number of beeps or signals emitted by the hand-held probe 40. When the hand-held probe is returned, the stored data may be downloaded to an office computer system (block 34). This data may be compared to the corresponding load tickets to verify whether the driver has complied with the above described method of delivering petroleum (block 36). This data may also be used to analyze the driver's actions, especially those where an error was prevented, to improve the method further. The method is then repeated each day of delivery.

The above method of delivering petroleum and similar products has been described herein in considerable detail in order to comply with the Patent Statutes and to provide those skilled in the art with the information needed to apply the novel principles, method and use of such specialized components as are required. However, it is to be understood that the method can be carried out by specifically different equipment and devices, and that various modifications, both as to the equipment details and operating procedures, can be accomplished without departing from the scope of the invention itself.

What is claimed is:

1. A method for ensuring accurate delivery of petroleum or similar products from a storage facility to the storage tanks of a customer comprising:

(a) providing each of the storage tanks with a machine-readable identifier carrying encoded information;

(b) providing a delivery truck having an outlet spigot to which a delivery hose may be connected, said spigot having a further machine-readable identifier affixed to it;

(c) providing to a driver of the delivery truck a load ticket having information thereon concerning a delivery to be made and a digital probe device having a microprocessor and a RAM memory storing therein at least some of the information from the load ticket;

(d) loading said delivery truck at the storage facility with a product in accordance with the information contained on said load ticket;

(e) transporting said product to the customer;

(f) using said digital probe to read said machine-readable identifiers on said storage tanks and on said spigot;

(g) comparing information read from said machine-readable identifiers with information stored in said RAM memory for matching the product contained in said delivery truck with the proper one of said storage tanks of said customer; and (h) transferring the product from said delivery truck into said matching storage tank of said customer.

2. The method as recited in claim 1 wherein the delivery truck is partitioned into a plurality of compartments for transporting a different product in each compartment, each compartment having an outlet spigot to which a delivery hose may be connected, each of said spigots further having a machine-readable identifier affixed to it; and further including the steps of:

(a) loading each of said compartments at the storage facility with products in accordance with the information contained on said load ticket;

(b) using said probe to read said machine-readable identifiers on each said spigot, and on each said storage tank for confirming a match of said compartments to said storage tanks; and (c) transferring said products from said matching compartments into said matching storage tanks of said customer.

3. The method as recited in claim 1 wherein the delivery truck is partitioned into a plurality of compartments for transporting a different product in each compartment, each compartment having a valve controlling the flow of product to a manifold to which a meter and delivery hose may be connected, each of said valves further having a machine-readable identifier affixed to it; and further including the steps of:

(a) loading each of said compartments at the storage facility with products in accordance with the information contained on said load ticket;

(b) using said probe to read said machine-readable identifiers on each said valves, and on each said storage tank for confirming a match of said compartments to said storage tanks; and (c) transferring said products from said matching compartments into said matching storage tanks of said customer.

4. The method as recited in claim 1 wherein said machine-readable identifier carrying encoded information comprises a passive read only memory device.

5. The method as recited in claim 1 and further including the step of verifying compliance with said load ticket by said driver after said delivery.

6. The method as recited in claim 1 and further including the step of verifying that said digital probe device provided to said driver matches an identification badge of said driver prior to loading said truck at the storage facility.

7. The method as recited in claim 1 and further including the steps of:

(a) storing in said digital probe device information read from said machine-readable identifiers; and (b) downloading all stored information from said digital probe device into an office computer following the delivery of the products.

8. A method for ensuring accurate delivery of petroleum or similar products from a storage facility to the storage tanks of a customer comprising:

(a) providing each of said storage tanks with a machine-readable tag carrying encoded information;

(b) providing a truck partitioned into a plurality of compartments for transporting a different product in each compartment, each compartment having an outlet spigot to which a delivery hose may be connected, each of said spigots having a machine-readable tag affixed to it;

(c) providing to a driver of the truck a load ticket having information thereon concerning a delivery or deliveries to be made, and a digital probe device having a microprocessor and a RAM memory for storing at least some of the information from the load ticket;

(d) loading each of said compartments at the storage facility with products in accordance with the information contained on said load ticket;

(e) transporting said products to the customers;

(f) using said digital probe to read said machine-readable tags on said tanks and on said spigots;

(g) comparing information read from said machine-readable tags with information stored in said RAM memory for matching the products contained in each of said compartments with the proper one of said tanks at said customer; and (h) transferring said products from said matching compartments into said matching tanks of said customer.

9. The method as recited in claim 8 wherein said tag comprises a passive read only memory device.

10. The method as recited in claim 8 and further including the step of verifying compliance with said load ticket by said driver after said delivery.

11. The method as recited in claim 8 and further including the step of verifying that said digital probe device provided to said driver matches an identification badge of that driver prior to loading said truck at the storage facility.

12. The method as recited in claim 8 and further including the steps of:

(a) storing in said digital probe device information read from said machine-readable identifiers; and (b) downloading all stored information from said digital probe device into an office computer following delivery of the products.

13. A method for ensuring accurate delivery of petroleum or similar products from a storage facility to the storage tanks of a customer comprising:

(a) providing each of said storage tanks with a machine-readable tag carrying encoded information;

(b) providing a truck partitioned into a plurality of compartments for transporting a different product in each compartment, each compartment having an outlet valve controlling the flow of product to a meter and delivery hose, each of said outlet valves having a machine-readable tag affixed to it;

(c) providing to a driver of the truck a load ticket having information thereon Concerning a delivery or deliveries to be made, and a digital probe device having a microprocessor and a RAM memory for storing at least some of the information from the load ticket;

(d) loading each of said compartments at the storage facility with products in accordance with the information contained on said load ticket;

(e) transporting said products to the customers;

(f) using said digital probe to read said machine-readable tags on said tanks and on said outlet valves;

(g) comparing information read from said machine-readable tags with information stored in said RAM memory for matching the products contained in each of said compartments with the proper one of said tanks at said customer; and (h) transferring said products from said matching compartments into said matching tanks of said customer.

14. The method as recited in claim 13 wherein said tag comprises a passive read only memory device.

15. The method as recited in claim 13 and further including the step of verifying compliance with said load ticket by said driver after said delivery.

16. The method as recited in claim 13 and further including the step of verifying that said digital probe device provided to said driver matches an identification badge of that driver prior to loading said truck at the storage facility.

17. The method as recited in claim 13 and further including the steps of:

(a) storing in said digital probe device information read from said machine-readable identifiers; and (b) downloading all stored information from said digital probe device into an office computer following delivery of the products.

* * * * *